United States Patent
Funayose et al.

(10) Patent No.: US 7,843,318 B2
(45) Date of Patent: Nov. 30, 2010

(54) MONITORING APPARATUS FOR ELECTRONIC KEY AND DISPLAYING APPARATUS FOR POSITIONAL INFORMATION ON ELECTRONIC KEY

(75) Inventors: Yusuke Funayose, Saitama (JP); Takao Yamamoto, Saitama (JP); Tomohiko Yashiro, Saitama (JP); Takeshi Konno, Saitama (JP); Masaki Yamazaki, Saitama (JP); Sho Yamamoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 145 days.

(21) Appl. No.: 11/488,613

(22) Filed: Jul. 19, 2006

(65) Prior Publication Data

US 2007/0018799 A1  Jan. 25, 2007

(30) Foreign Application Priority Data

Jul. 19, 2005  (JP)  ............................. 2005-208412

(51) Int. Cl.
*B60R 25/10* (2006.01)
(52) U.S. Cl. ............................. 340/426.11; 340/825.49; 340/539.13; 701/213
(58) Field of Classification Search ................................
340/426.11–426.19, 825.49, 539.1, 539.11, 340/539.13, 539.23; 701/213–216
See application file for complete search history.

(56) References Cited

U.S. PATENT DOCUMENTS

| | | | | |
|---|---|---|---|---|
| 5,796,365 | A * | 8/1998 | Lewis | 342/357.03 |
| 6,392,592 | B1 * | 5/2002 | Johnson et al. | 342/357.07 |
| 6,774,811 | B2 * | 8/2004 | Kaufman et al. | 340/825.49 |
| 6,788,189 | B2 * | 9/2004 | Kikkawa et al. | 340/426.1 |
| 6,879,247 | B2 * | 4/2005 | Shimomura et al. | 340/426.18 |
| 7,046,141 | B2 * | 5/2006 | Pucci et al. | 340/539.32 |
| 7,323,983 | B2 * | 1/2008 | Bergman | 340/539.23 |
| 7,323,988 | B2 * | 1/2008 | Krstulich | 340/572.1 |
| 7,394,364 | B2 * | 7/2008 | Elliott | 340/539.23 |
| 2003/0080875 | A1 * | 5/2003 | Wathen | 340/825.72 |
| 2003/0160692 | A1 | 8/2003 | Nonaka | |
| 2004/0160314 | A1 * | 8/2004 | Utter et al. | 340/426.1 |

(Continued)

FOREIGN PATENT DOCUMENTS

JP  2001-349110 A  12/2001

(Continued)

*Primary Examiner*—Davetta W Goins
*Assistant Examiner*—Edny Labbees
(74) *Attorney, Agent, or Firm*—Birch, Stewart, Kolasch & Birch, LLP

(57) ABSTRACT

A control unit having an immobilizer function includes a circuit for transmitting a request signal within a predetermined range. After receiving a reply signal from an electronic key in response to this request signal once and allowing a movable body to move, when a reply signal to the periodically sent request signal is not received, it is determined that the electronic key is out of the range, and it is assumed that the key has been dropped. A monitor section outputs a warning signal and transmits the warning signal to the navigation unit. A navigation unit, in response to the warning signal, stores the location at that time as the positional information on the electronic key. The navigation unit also displays a map showing the location of a key based on positional information on the electronic key. With this system, a lost electronic key may be readily located.

20 Claims, 9 Drawing Sheets

U.S. PATENT DOCUMENTS

| | | |
|---|---|---|
| 2005/0195069 A1* | 9/2005 | Dunand .................. 340/5.61 |
| 2005/0242929 A1* | 11/2005 | Onishi et al. ........... 340/426.17 |
| 2006/0080875 A1* | 4/2006 | Nelson et al. ............. 40/593 |
| 2006/0145836 A1 | 7/2006 | Miyazaki |

FOREIGN PATENT DOCUMENTS

| | | |
|---|---|---|
| JP | 2002-289883 A | 9/2002 |
| JP | 2002-340808 A | 11/2002 |
| JP | 2003-187071 A | 5/2003 |
| JP | 2003-157357 A | 7/2003 |
| JP | 2004-114860 A | 4/2004 |
| JP | 2005-178666 A | 7/2005 |

* cited by examiner

FIG. 1
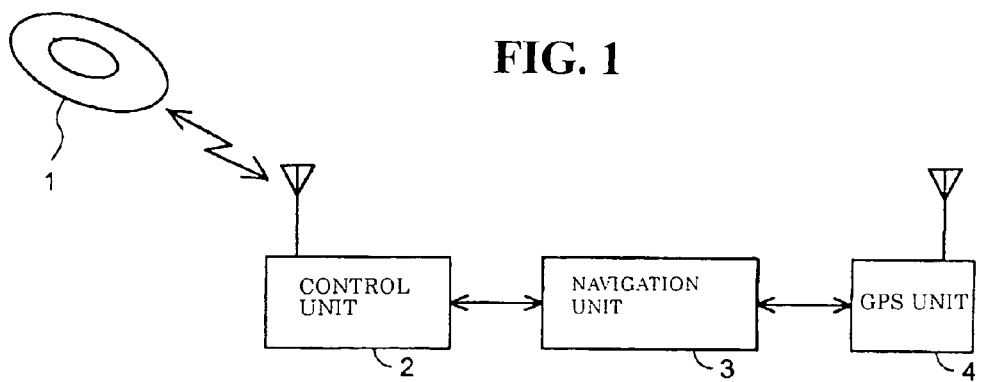
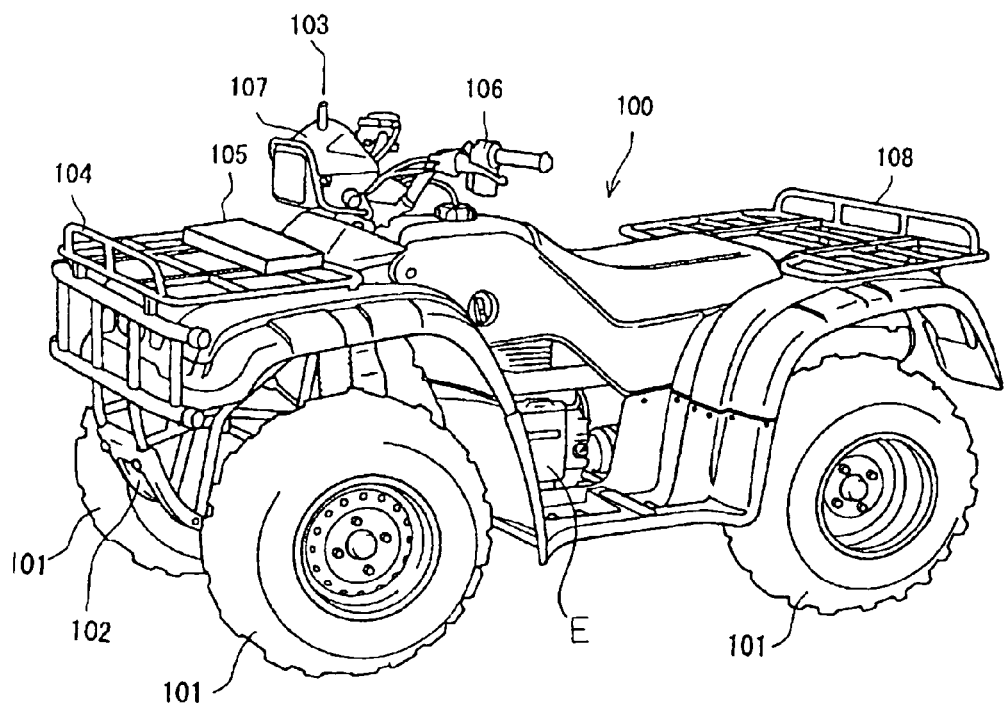
FIG. 2

US 7,843,318 B2

MONITORING APPARATUS FOR ELECTRONIC KEY AND DISPLAYING APPARATUS FOR POSITIONAL INFORMATION ON ELECTRONIC KEY

CROSS-REFERENCE TO RELATED APPLICATION

The present application claims priority under 35 U.S.C. §119 to Japanese Patent Application No. 2005-208412, filed Jul. 19, 2005, the entire contents of which are hereby incorporated by reference.

BACKGROUND OF THE INVENTION

1. Field of the Invention

The present invention relates to a monitoring apparatus for an electronic key and a displaying apparatus for positional information on an electronic key. Particularly, it relates to a monitoring apparatus for an electronic key and a displaying apparatus for positional information on an electronic key, which are capable of displaying positional information on the electronic key in a GPS navigation unit mounted on a movable body.

2. Description of Background Art

There is a known portable type transmitter-receiver, which receives a request signal from a control unit mounted on a vehicle and which transmits a reply signal of this request signal, i.e., an electronic key used for a vehicle. For example, in an electronic key system disclosed in Japanese Patent Laid-open Publication No. 2001-349110, a control unit on a vehicle verifies identification information contained in a reply signal in response to a request signal with pre-registered identification information, and a door is unlocked at the stage where these pieces of identification information coincide with each other. Moreover, the electronic key system is configured such that upon operation of an ignition knob, a communication for enabling an engine to start is carried out between a control unit and the electronic key. If these pieces of identification information coincide with each other also in the verification of the identification information carried out via this communication, then the engine starts.

Unlike a conventional key used by being inserted into a key hole of a vehicle, the electronic key may be lost because the electronic key functions without being physically connected to a car body. Even if the electronic key is dropped, in vehicles such as a four-wheel vehicle having a cabin, the electronic key would less likely fall out of the cabin and be lost. However, in motorcycles, all-terrain vehicles (ATV), or the like, which do not have a cabin, if the electronic key is dropped, these vehicles would most likely run away leaving the electronic key on the road, or the like.

Then, the present inventor proposed an electronic key system, wherein a warning is outputted when there is no response to a request signal outputted when the start switch of a vehicle is on (Japanese Patent Laid-open Publication No. 2004-114860). According to this system, when the electronic key is outside the communication range of the vehicle, in other words, when the vehicle travels leaving the electronic key on the road, or the like, a warning indicating as such is given. Therefore, an advantage is that the lost electronic key can be found just stopping the vehicle immediately and searching within a limited range.

According to the system described in Japanese Patent Laid-open Publication No. 2004-114860, the location where the electronic key is lost can be limited to some extent for search. However, a driver may keep on traveling without noticing the warning. In this case, the range to be searched will be wider, and the electronic key may not be found. Thus, a system is expected, in which the electronic key can be found out within a limited range of search.

SUMMARY AND OBJECTS OF THE INVENTION

An object of the present invention is to provide a monitoring apparatus for an electronic key and a displaying apparatus for positional information on an electronic key, used for a movable body such as vehicles, by which a lost electronic key can be found by just searching a significantly limited range even when it is noticed at a later time that the key is lost.

The present invention to achieve the above-mentioned objects is characterized firstly by comprising an immobilizer mounted on a movable body; a GPS navigation unit mounted on the movable body; monitoring means for continuously detecting communication status between an electronic key and the immobilizer, which communication deactivates a function of the immobilizer; and means for informing the GPS navigation unit of the detected communication status.

Moreover, the present invention is characterized secondly by comprising an immobilizer mounted on a movable body; a GPS navigation unit mounted on the movable body; and display control means which displays positional information at a time when communication stopped between an electronic key and the immobilizer, which communication deactivates a function of the immobilizer, on a display panel of the GPS navigation unit as positional information on the electronic key.

Moreover, the present invention is characterized thirdly by comprising a control unit mounted on a movable body, which includes an immobilizer allowing a driving source of a movable body to be started via communication with an electronic key; a navigation unit mounted on the movable body, which navigates and guides the movable body using a GPS electric wave; a transmitting section provided in the control unit, which transmits a request signal within a predetermined range; a receiving section provided in the control unit, which receives a reply signal transmitted by the electronic key in response to the request signal; means for storing a location of the movable body at a time when the receiving section fails to receive the reply signal in response to the request signal sent after the driving source is started; and means for displaying the stored location as the positional information on the electronic key on a display panel of the navigation unit.

Moreover, the present invention is characterized fourthly in that the positional information on the electronic key is displayed on a map using a mark and/or in text indicating a longitude and a latitude; and is fifthly characterized in that the immobilizer is built in the GPS navigation unit.

Moreover, the present invention is characterized sixthly in that the movable body is any one of a saddle-ride type vehicle, a two-wheeled vehicle, and a surface craft; and seventhly in that the stored location is called to be displayed in a display panel.

Moreover, the present invention is characterized eighthly by comprising a warning light to be energized when the reply signal fails to be detected.

Furthermore, the present invention is characterized ninthly by comprising means for setting a positional information at a time in the navigation unit as a navigation destination when the reply signal fails to be detected.

According to the first characteristic of the present invention, communication status between an electronic key and an immobilizer are continuously monitored and informed to a navigation unit. Therefore, the communication status can be monitored, for example, on a display unit provided in a navigation unit.

According to the second and third characteristics of the present invention, when the communication with the electronic key stops (that is, the communication was once being carried out), for example, when a reply signal to a request signal fails to be received after driving means is started, it is determined that the electronic key is not following the movement of the movable body, in other words, that the electronic key is dropped. Then, the location where the communication stops is displayed on the display panel of the GPS navigation unit. In particular, according to the second characteristic of the present invention, the location where the communication stops is stored, and the positional information can be called to be displayed on the display panel at any time.

According to a fourth characteristic of the present invention, both types of navigation units, one with a map display function and one without the function, can be accommodated.

According to a fifth characteristic of the present invention, the location where the electronic key is lost can be displayed in a navigation unit with a built-in immobilizer.

According to a sixth characteristic of the present invention, it is possible to adequately handle the loss of an electronic key in a movable body without a cabin, such as a saddle-ride type ATV vehicle, a motorcycle, and a surface craft, wherein the electronic key is more likely to be dropped on the ground or into the water.

According to a seventh characteristic, even in a case of not noticing, at the exact moment, that the electronic key is dropped, it is possible to call the stored data and to display the location of the key at a later time.

According to an eighth characteristic, it is possible to inform more clearly that the electronic key is dropped by turning on a warning light.

According to a ninth characteristic, it is possible by means of a function of the navigation unit, to automatically navigate and guide to the place where the electronic key was lost.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a block diagram showing a system configuration of a displaying apparatus for positional information on a key according to an embodiment of the present invention;

FIG. 2 is a perspective view of an all-terrain vehicle in which a displaying apparatus for positional information on a key according to an embodiment of the present invention is mounted;

FIG. 9 is a side view of a small surface craft in which a displaying apparatus for positional information on a key according to an embodiment of the present invention is mounted; and.

DETAILED DESCRIPTION OF THE PREFERRED EMBODIMENTS

Figure 3:
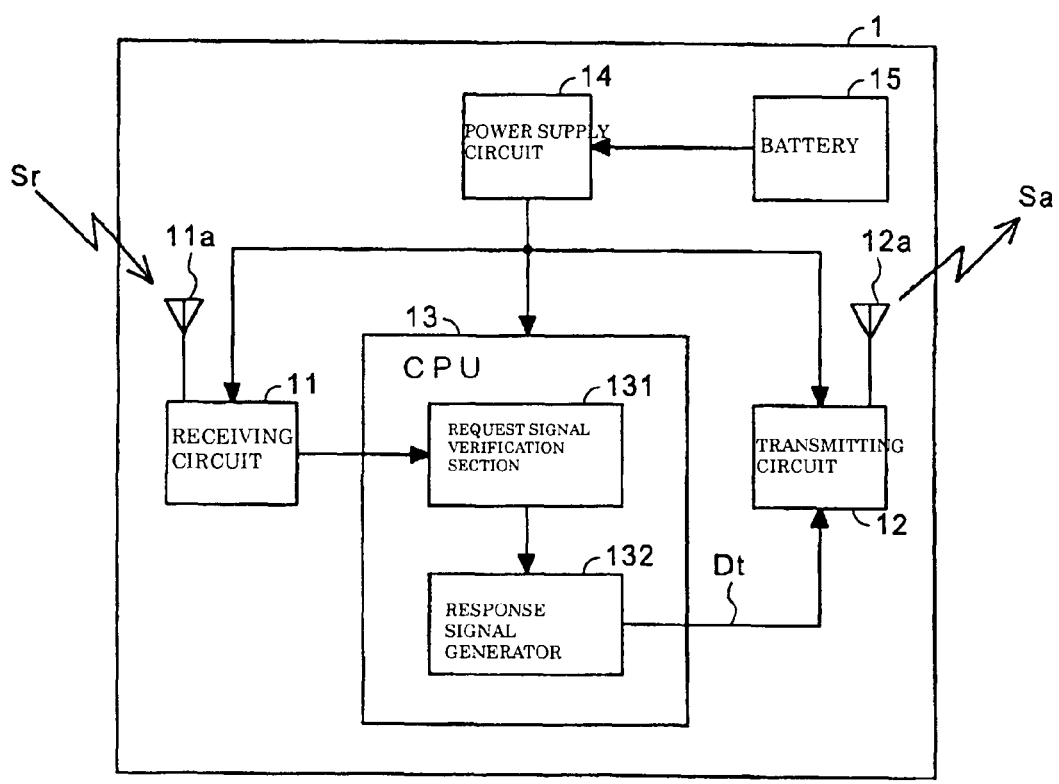
FIG. 3 is a block diagram showing a configuration of an electronic key.

FIG. 2 is a perspective view of an ATV equipped with a displaying apparatus for positional information on an electronic key according to the present invention. ATV 100 is a vehicle suitable for rough-terrain driving, which is provided with major diameter wheels 101, an under cover 102, and a four-wheel drive mechanism coupled to an engine E.

A meter unit 107 is prepared in the center section of a handle 106, on top of which a GPS receiving antenna 103 is arranged in a standing condition. Although ATV 100 is often used in a rough terrain where a posture during driving changes greatly, employing a helical-type antenna as the receiving antenna 103 allows a GPS electric wave to be received excellently irrespective of the changes of the posture.

At a front part and a rear part of the vehicle, a front carrier 104 and a rear carrier 108 are mounted, respectively. In an upper back part of the front carrier 104, there is mounted a navigation box 105 housing a navigation unit, which displays a location of ATV 100 based on the GPS electric wave and map information. This ATV 100 employs a keyless entry wherein an ID transmitted by the electronic key is recognized via communication with the electronic key, thereby allowing the engine to be started and the handle to be operated.

FIG. 1 is a configuration diagram of a keyless entry system and a navigation system including the displaying apparatus for positional information on an electronic key. This keyless entry system and the navigation system include an electronic key 1, a control unit 2, a navigation unit 3, and a GPS unit 4. Note that, although here the present invention is described on the basis of an embodiment for ATV, the keyless entry system and the navigation system are similarly applicable to saddle-ride type movable bodies in general, such as various motorcycles, water vehicles, snow vehicles.

The electronic key 1 is a radio transmitter-receiver incorporated into a card-shaped or key-shaped case, and has unique identification information (ID information). The control unit 2 has an immobilizer function to be carried out on the basis of communication with the electronic key 1, and also has a communication function including a function to transmit a communication blackout signal to the navigation unit 3 when the communication with an electronic key 1 stops after a movable body starts traveling. Details will be described later. The navigation unit 3 has a GPS function, wherein positional information on the relevant movable body recognized by the GPS function is displayed at least in longitude and latitude. Preferably, the location of its own vehicle based on the positional information is displayed as a mark on a map. Moreover, while the location of its own vehicle is displayed, navigation guide information for navigating the vehicle towards an inputted navigation destination is displayed. Such displaying is one of the general functions of the navigation unit, which, for example, is described in Japanese Patent Laid-open Publication No. 2002-286482.

Further, a function is included to store and display the positional information at a time when the function responds to the communication blackout signal inputted from the control unit 2. With this displaying, the place where the electronic key 1 gets out of the range of communication capabilities of the control unit, i.e., the place where the electronic key 1 is dropped, is determined. The detail will be described later.

FIG. 3 is a block diagram showing a configuration of the electronic key 1. The electronic key 1 includes a receiving circuit 11, a transmitting circuit 12, a CPU 13, a power supply circuit 14, and a battery 15. The CPU 13 includes, as its functions, a request signal verification section 131 and a reply signal generator 132. The receiving circuit 11, transmitting circuit 12, and a CPU 13 are driven by a power supply generated in the power supply circuit 14 on the basis of the output from the battery 15. The receiving circuit 11 has a receiving-antenna 11a, and receives a signal via this receiving-antenna 11a. The request signal verification section 131 determines whether the signal received in the receiving circuit 11 is a request signal Sr sent from the control unit 2. If the received signal is the request signal Sr, the request signal verification section 131 outputs an ID request signal to the reply signal generator 132. The reply signal generator 132 reads out an ID data Dt, which is stored in a ROM (not shown), on the basis of the ID request signal from the request signal verification section 131, and supplies the ID data Dt to the transmitting circuit 12. The transmitting circuit 12 transmits a reply signal Sa to the request signal Sr via a transmitting antenna 12a, the reply signal Sa containing the ID data Dt.

Figure 4:
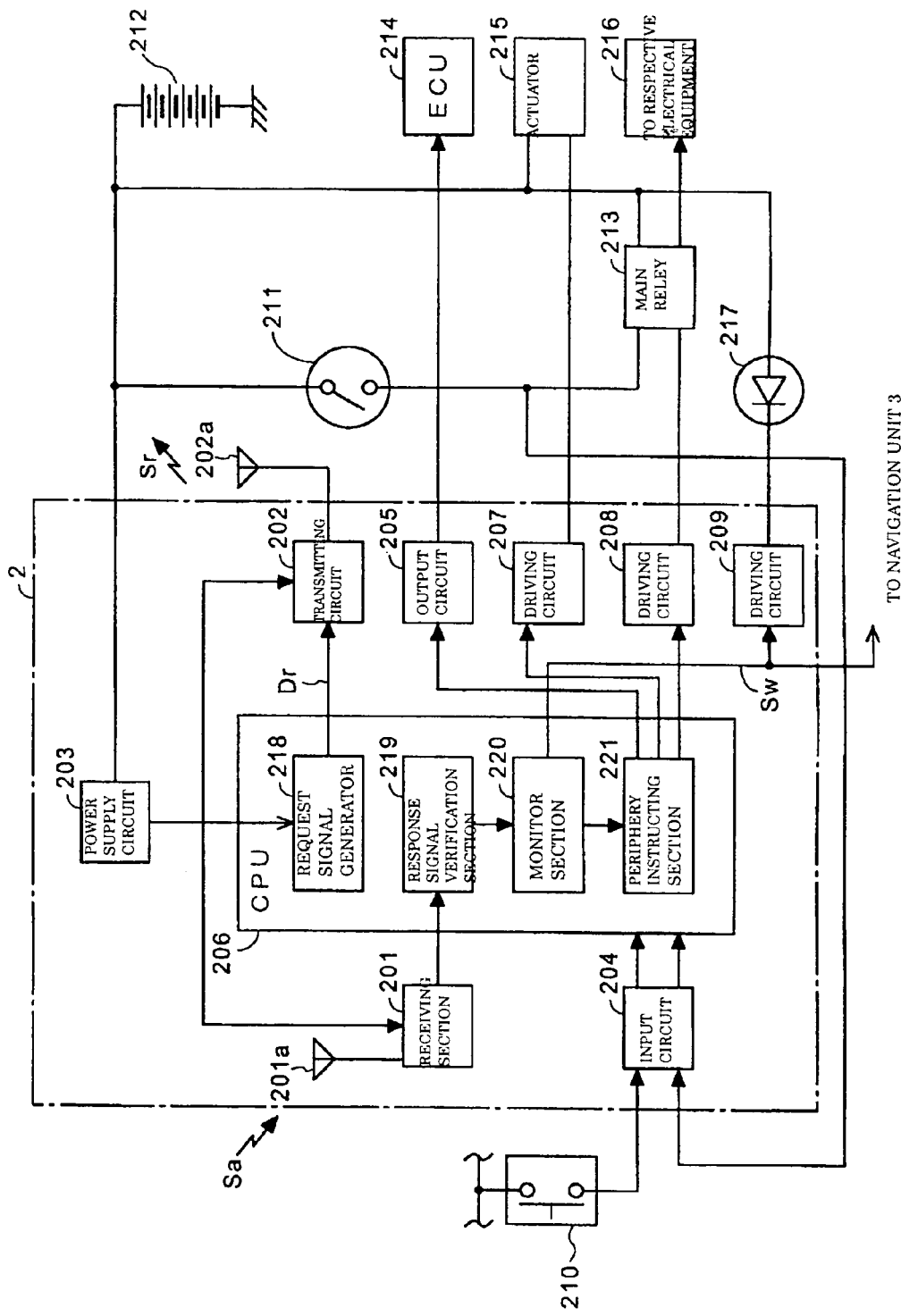
FIG. 4 is a block diagram showing a configuration of a control unit.

FIG. 4 is a block diagram showing a configuration of the control unit 2. The control unit 2 includes a receiving circuit 201, a transmitting circuit 202, a power supply circuit 203, an input circuit 204, an output circuit 205, a CPU 206, and first through third driving circuits 207, 208, and 209. As means for an input, such as instructions, to the control unit 2, a start switch 210 and a main switch 211 are prepared. An ECU 214 is coupled to the output circuit 205, an actuator 215 is coupled to the first driving circuit 207, a main relay 213 is coupled to the second driving circuit 208, and a warning light 217 is coupled to the third driving circuit 209, respectively. Moreover, other respective electrical equipment 216 is coupled to the main relay 213.

The main switch 211 is prepared to be used for starting ATV 100. The start switch 210 is prepared for starting an electronic key system, i.e., the keyless entry system. The main relay 213 is a component for opening and closing the electric current supply paths to the electrical equipment 216, such as lamps. The ECU 214 is a unit for carrying out a fuel-injection control and an ignition control of the engine E which is the driving source for ATV 100. The actuator 215 is driving means, such as a solenoid, for driving locking means (a handle lock) which controls the movement of the handle of ATV 100 in order to prevent theft.

The CPU 206, as its functions, has a request signal generator 218, a reply signal verification section 219, a monitor section 220, and a periphery instructing section 221.

The power supply circuit 203 produces a predetermined power supply based on electric power supplied from a battery 212, and supplies the electric power to the CPU 206, the receiving circuit 201, the transmitting circuit 202, and the like. The request signal generator 218 of the CPU 206 reads out a request data Dr from the ROM (not shown) on the basis of a turning-ON operation of the start switch 210 and main switch 211, and outputs the request data Dr to the transmitting circuit 202. The request signal generator 218 not only responds to the turning-ON operation of these switches, but also outputs the request data Dr to the transmitting circuit 202 in every predetermined time period after the engine is started.

The transmitting circuit 202 transmits the request signal Sr, which is formed on the basis of the request data Dr supplied from the CPU 206. The range in which the request signal Sr can be transmitted is 1.0 to 1.5 m in radius about a transmitting antenna 202a provided in the transmitting circuit 202, and is a narrow range compared with the range in which the reply signal by the electronic key 1 can be transmitted. The receiving circuit 201 receives the reply signal Sa sent from the electronic key 1 via a receiving-antenna 201a.

The reply signal verification section 219 verifies whether the signal supplied from the receiving circuit 201 is the reply signal Sa. Furthermore, if the signal is the reply signal Sa, the reply signal verification section 219 verifies whether the ID data Dt contained in this reply signal Sa coincides with an ID data registered in a memory (not shown).

The monitor section 220 monitors the presence or absence of arrival of the reply signal Sa after transmitting the request signal Sr from the transmitting circuit 202. If the reply signal Sa has not been detected within a predetermined time, a warning signal Sw is outputted to the third driving circuit 209. In addition, in the case where the request signal Sr is continuously sent in every predetermined time period, the monitor section 220 may measure the time of when the reply signal is not detected within a predetermined time, and may output the warning signal Sw when this measured time reaches a predetermined value. This is for preventing the warning signal Sw from being outputted on the basis of the wrong detection due to noises, and the like.

Moreover, when the reply signal Sa to the request signal Sr sent in response to the turning-ON operation of the start switch 210 is detected, the periphery instructing section 221 outputs a lock-release signal to the first driving circuit 207, outputs an enabling signal to the output circuit 205, and furthermore outputs a turning-ON signal to the second driving circuit 208. In response to the respective signals from the periphery instructing section 221, the handle lock is released, the ECU 214 is enabled and the engine is started, and the electrical equipment 216 is enabled, respectively.

Moreover, the warning signal Sw, which is outputted when communication with the electronic key 1 stops, is sent to the navigation unit 3. The operation of the navigation unit 3 which responds to this warning signal Sw (i.e., a communication blackout signal) will be described.

Figure 5:
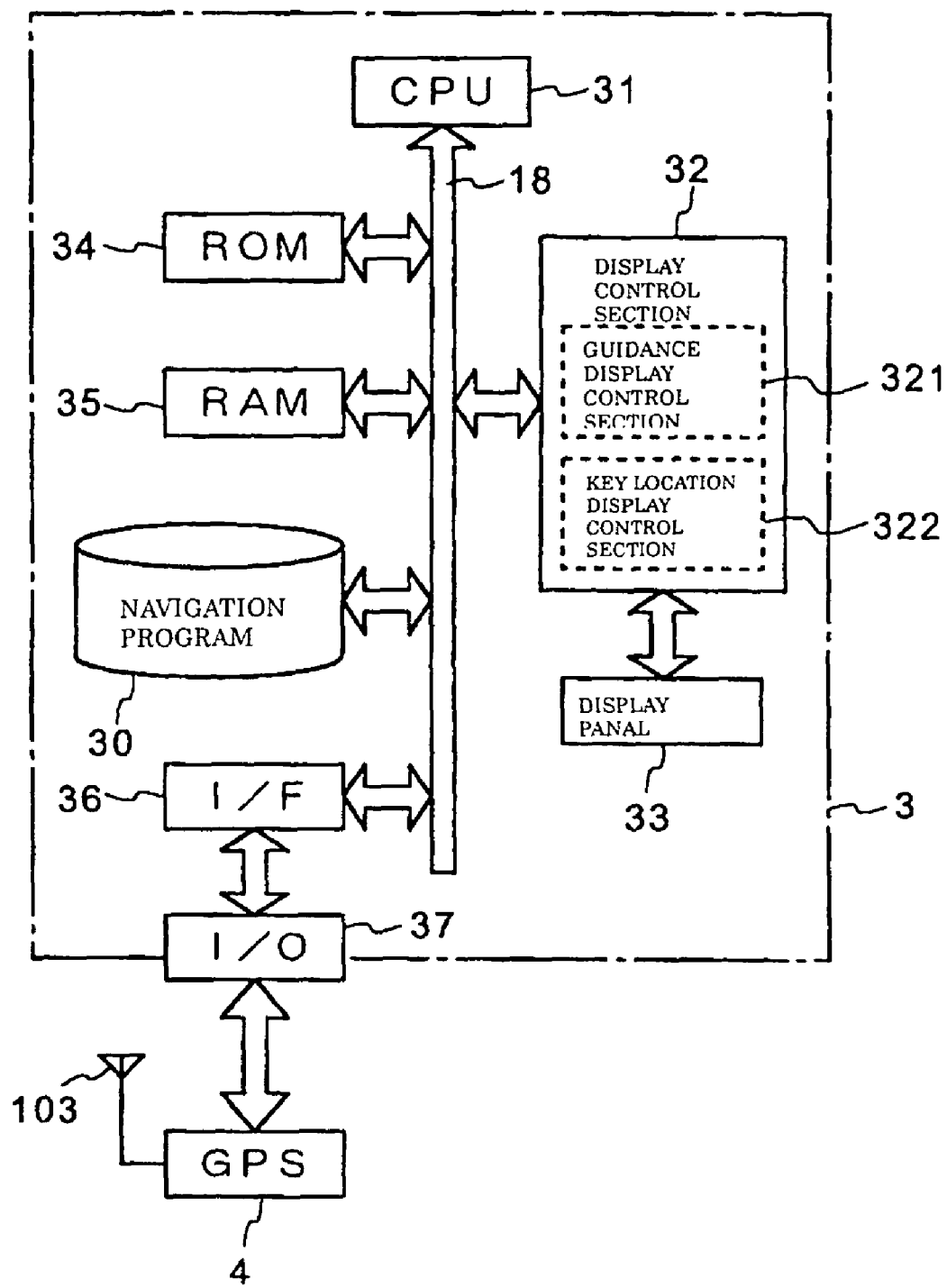
FIG. 5 is a block diagram showing a configuration of a navigation unit.

FIG. 5 is a block diagram showing a system configuration of the navigation unit. The navigation unit 3 is provided with a navigation program storing section 30, a CPU 31, a display control section 32, a display panel 33, a ROM 34, a RAM 35, an interface 36, and an I/O port 37, and is coupled to a GPS unit 4 via the I/O port 37 and an interface 36. The display control section 32 includes a guidance display control section 321 and a key location display control section 322. The guidance display control section 321 displays, on a display panel 33, a navigation guide information obtained by executing a navigation program. The navigation guide information includes a map information, the positional information on its own vehicle, the direction for the navigation destination, information on the distance to the navigation destination, and the like. Desirably, the positional information on its own vehicle is marked on a map and displayed in latitude and longitude.

The key location display control section 322 has a function to display the location of the electronic key 1 when the electronic key 1 gets out of the transmitting range of the request signal Dr from the transmitting circuit 205 of the control unit 2, i.e., when the electronic key 1 is assumed to be dropped, after the engine is started.

Figure 6:
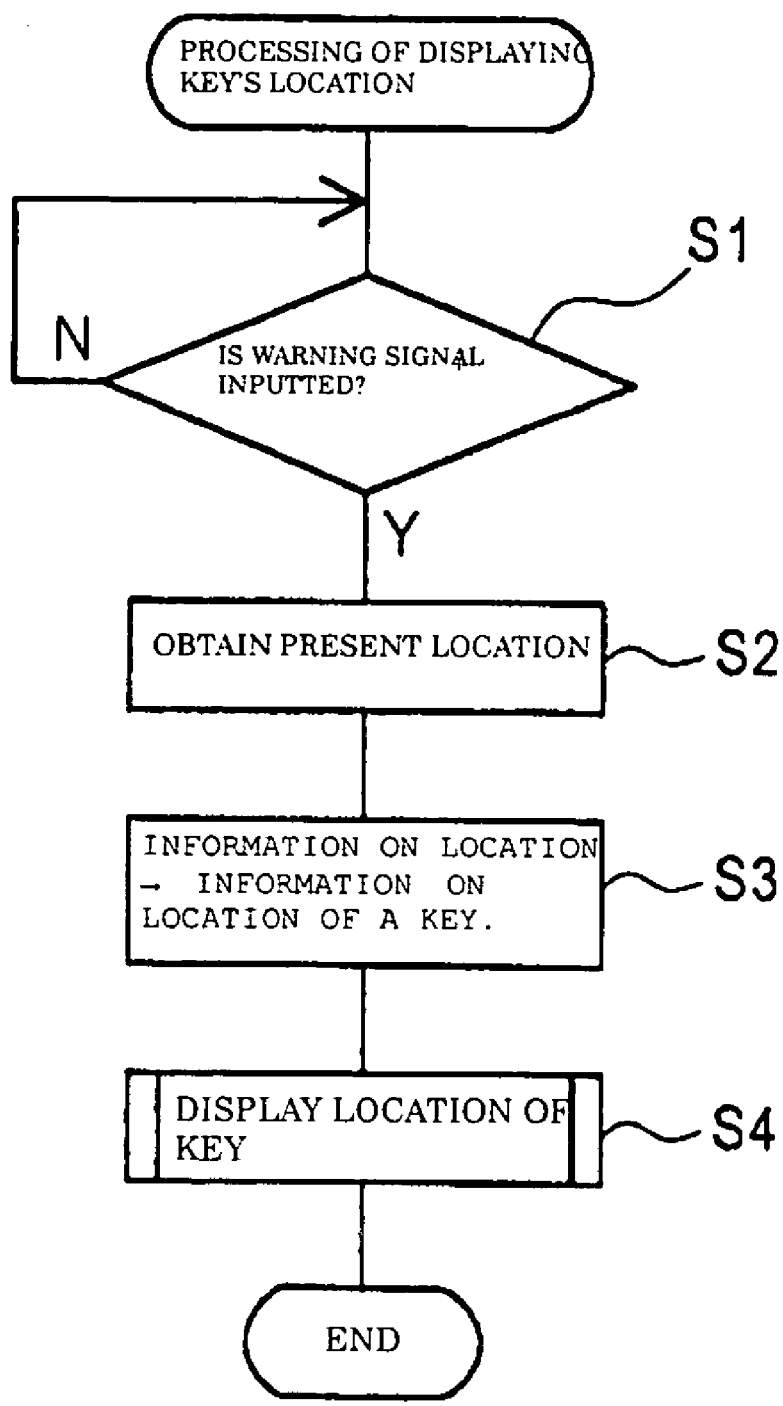
FIG. 6 is a flow chart of a processing of displaying positional information on a key.

The operation of the key location display control section 322 will be described with reference to a flow chart. In FIG. 6, in Step S1, it is determined whether the warning signal Sw is inputted. If the warning signal Sw is inputted, the flow proceeds to Step S2, in which the positional information is obtained from the GPS unit 4. In Step S3, the positional information is stored in an electronic key location memory section on the RAM 35 as the positional information on the electronic key. In Step S4, on the basis of the positional information on the electronic key, the location of the electronic key 1 is displayed on the map currently displayed on the display panel 33.

Figure 7:
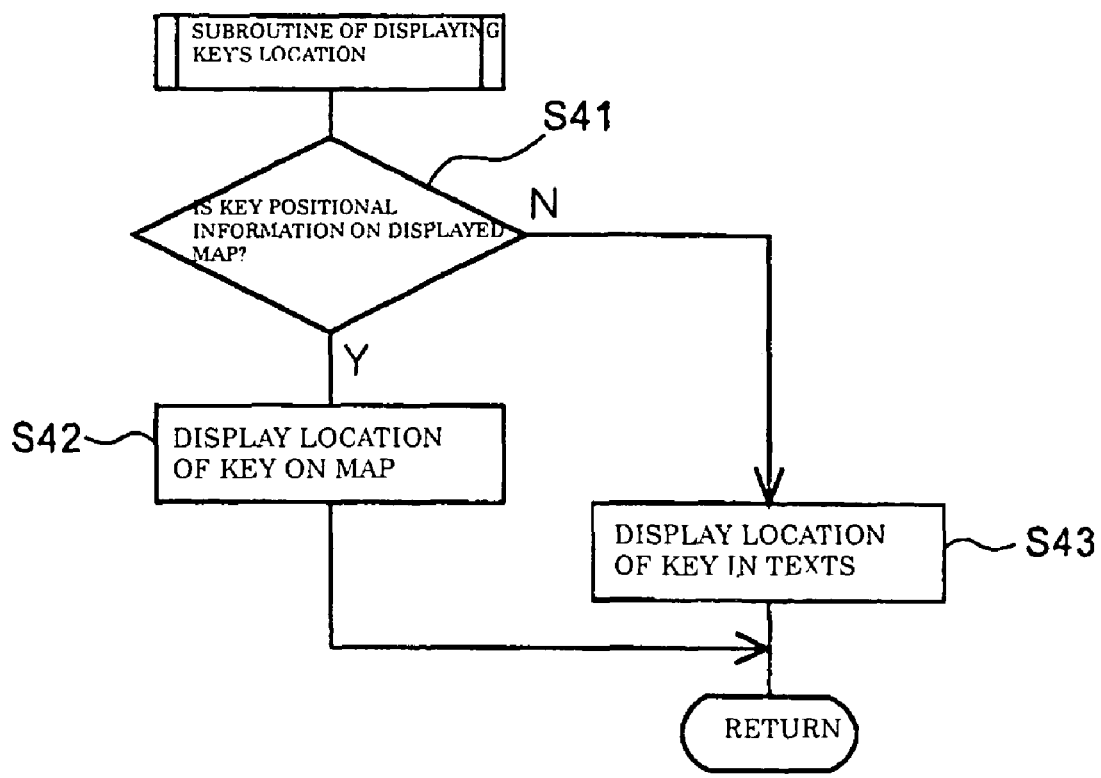
FIG. 7 is a detailed flow chart of the processing of displaying positional information on a key.

FIG. 7 is a flow chart showing the detailed processing of displaying the positional information on the electronic key. In Step S41, it is determined whether the location of the electronic key 1 is within the range of the map currently displayed on the display panel 33. If the judgment result in Step S41 is affirmative, the location of the electronic key 1 is shown on the map in Step S42. If the judgment result in Step S41 is negative, the flow proceeds to Step S43, in which the positional information on the electronic key is displayed in texts. The location may be shown, for example, in longitude and latitude, or a name and a lot number of the place corresponding to this longitude and latitude may be displayed.

Figure 8:
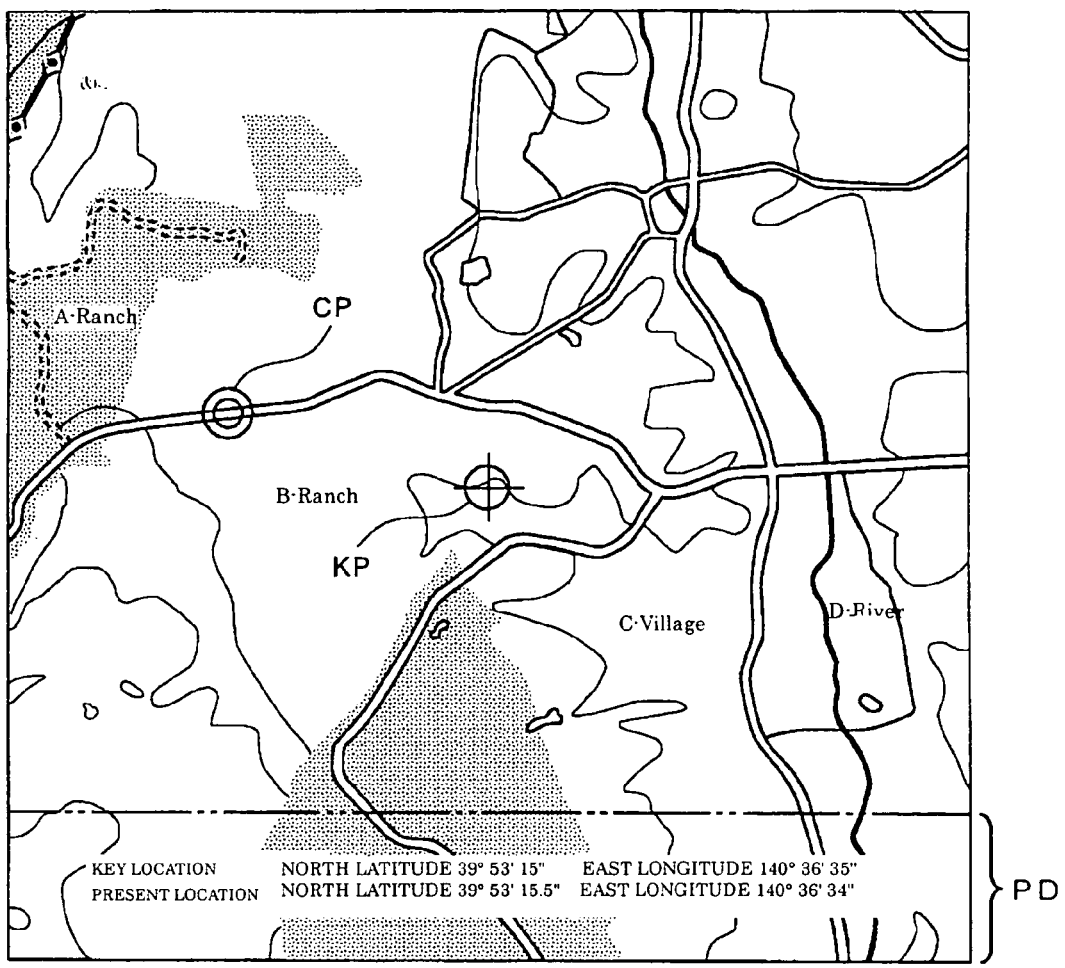
FIG. 8 is a view showing an example of a display screen for positional information on a key.

FIG. 8 is a view showing an example of displaying on the display panel 33. In this figure, the location of ATV 100 is indicated by a symbol CP. The location of the electronic key 1 is indicated by a symbol KP. In the lower part of the map, a positional information display section PD is prepared, in which the location as well as the location of the electronic key 1 can be displayed in longitude and latitude. In the case where the location of the electronic key 1 cannot be displayed with a symbol on the same map because of the traveling of ATV 100, the location of the electronic key 1 is displayed only in the positional information display section PD.

Moreover, the positional information on the electronic key may be displayed on the display panel 33 at the time when a driver notices that the electronic key 1 is lost. For example, key-location calling means (for example, a push button) is prepared, and when this push button is pushed, the positional information on the electronic key is read out from the electronic key location memory section. Further, the map information containing the location indicated by this positional information on the electronic key is read out from a map information storage section on the ROM 34. Then, while displaying the map on the display panel on the basis of this map information, the key location is displayed on the map according to the positional information on the electronic key. Preferably, the push button as the key-location calling means is prepared above the meter unit 107 of ATV, or on the navigation box 105.

In addition, means for storing an elapsed time and a travel distance since the communication stops, or means for storing either one of these, may be prepared in the navigation unit 3, allowing the driver to autonomously drive on the basis of this elapsed time and the travel distance and to search the electronic key 1 readily.

Furthermore, it is advantageous to prepare means for automatically setting up the positional information called by the key-location calling means, as the information showing the navigation destination in the navigation unit 3. When the driver recognizes that the electronic key 1 is lost, the driver only has to push the push button for the navigation unit 3 to initiate guidance to the navigation destination, i.e., the location where the key is lost.

Incidentally, in the above-described embodiments, communication is carried out between the electronic key 1 and the control unit 2, and on the basis of this result, the displaying is carried out in the navigation unit 3. However, the present invention is not restricted to this example. For example, in a system in which the function of the immobilizer in the control unit 2 is assigned to the navigation unit 3, the electronic key 1 is modified such that, during the communication with the navigation unit 3, the location of the electronic key 1 is stored and displayed at the time when the communication stops.

Figure 9:
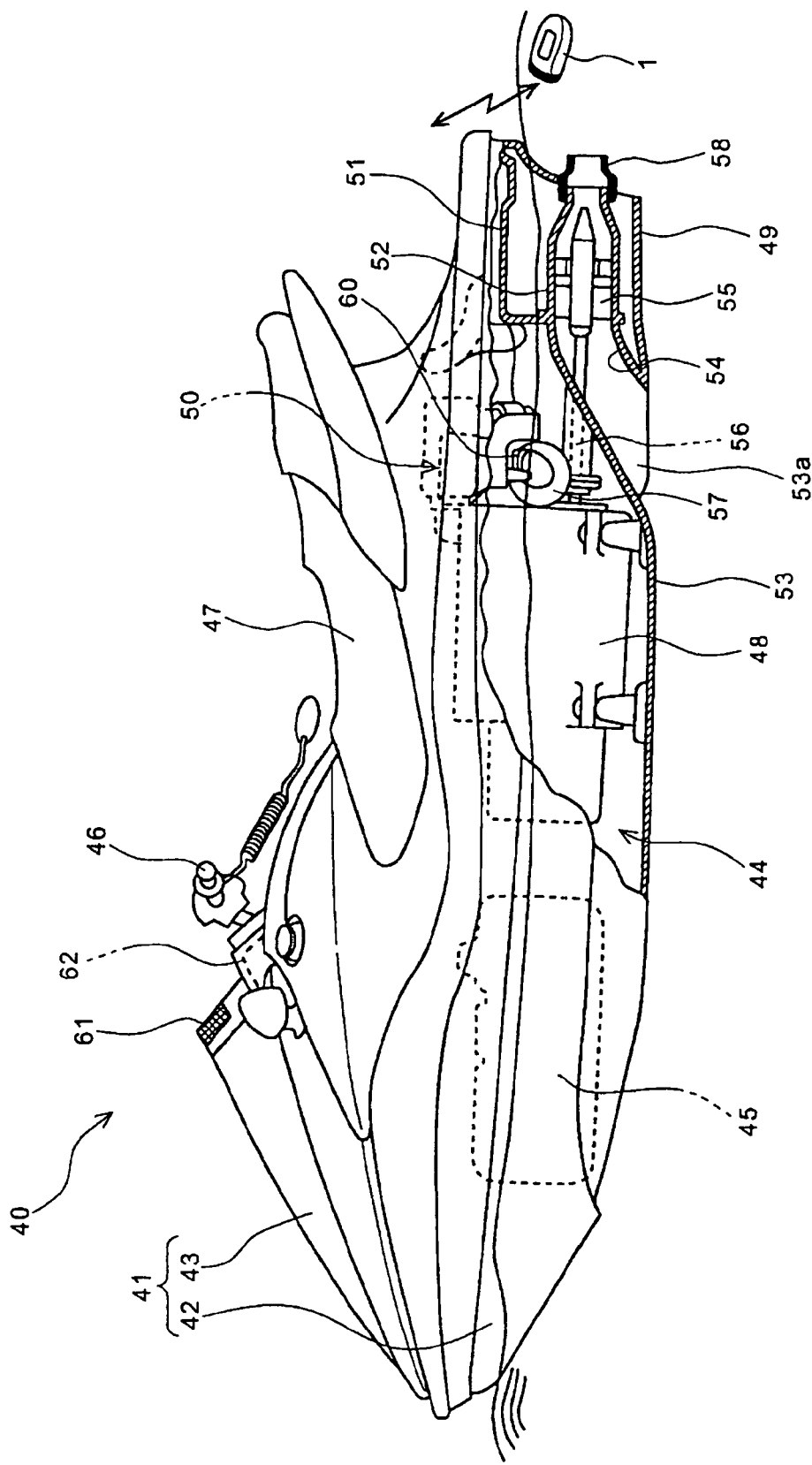

The present invention can be implemented as a positional information displaying apparatus for an electronic key for a hydroplane (a surface craft). FIG. 9 is a side view of a small surface craft in which the positional information displaying apparatus for the electronic key according to the present invention is mounted. In FIG. 9, a craft body 41 of a small craft 40 comprises a hull 42 which forms the lower part, and a deck 43 which forms the upper part. A fuel tank 45 is provided in the front part of a space 44 enclosed by the craft body 41, a steering handle 46 is provided above the fuel tank 45, and a saddle-ride type seat 47 is provided behind the steering handle 46.

A longitudinally long air-box 50 is provided in an intake-air system provided on the side face of an engine 48, which is arranged in the space 44. A jet propulsion machine room 51 is prepared in an astern 49 behind the engine 48, and a jet propulsion machine 52 is provided in this jet propulsion machine room 51. Namely, the small craft 40 is a jet propulsion craft.

The jet propulsion machine 52 has a housing 54 extending from an inlet 53a of a craft bottom 53 rearwards. An impeller 55 is installed rotatably inside the housing 54, and the impeller 55 is coupled to a driving shaft 56 of the engine 48.

When propelling the small craft 40, the air inside the space 44 is taken into the air-box 50, the air taken into the air-box 50 is led to a turbocharger 57 through an air passage 60, the fuel of a fuel tank 45 is mixed with the air which passed the turbocharger 57, and this mixed gas is introduced into a cylinder (not shown) of the engine 48.

By driving the engine 48 with this mixed gas, the impeller 55 is rotated with the engine 48. Accordingly, water is taken in from the inlet 53a of the craft bottom 53, and the water taken in is led as jet water to a steering nozzle 58 through the housing 54. Jetting out from the steering nozzle 58 the jet water led to the steering nozzle 58, allows the small craft 40 to be propelled.

A GPS antenna 61 is prepared in the highest part of the deck 43, and an immobilizer and a navigation unit are housed in a meter box 62 prepared around the steering handle 46. As for the electronic key 1 which communicates with the immobilizer, it is preferred that a special key suitable for the small craft 40 should be used. In other words, the electronic key 1 is one wherein a float (buoy) member is housed in a package made of resin, or the one wherein the package itself is formed from a foaming nature material to thereby reduce the density. The electronic key 1 consisting of such structure will float on the water surface WS even in the case where the electronic key 1 is dropped into the water, thereby achieving the effect that the electronic key 1 will be found easily.

Figure 10:
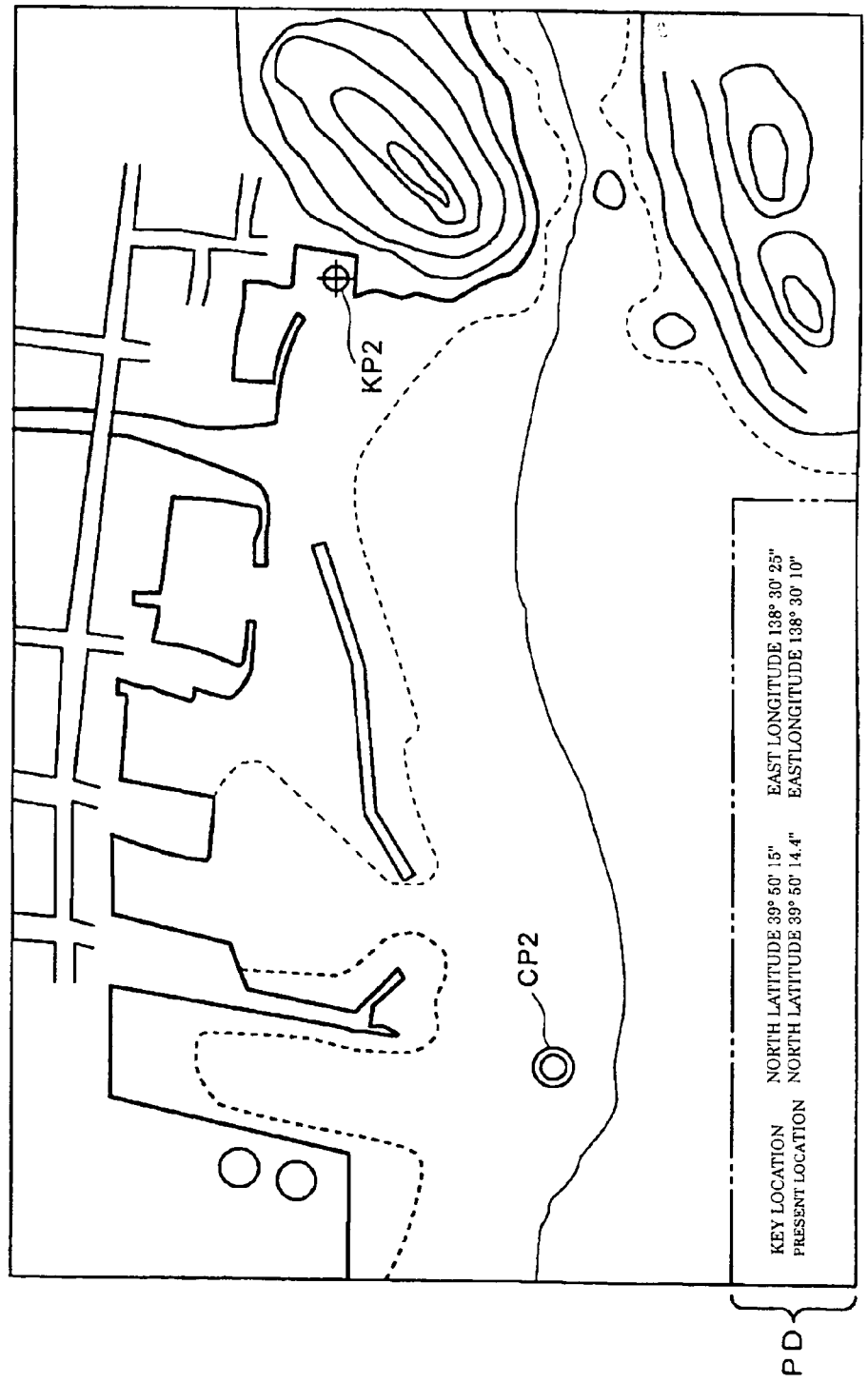
FIG. 10 is a view showing another example of a display screen for positional information on a key.

FIG. 10 is a view showing one example of a coast chart displayed on the display panel 33. In this figure, the location of a surface craft 200 is indicated by a symbol CP 2. The location of the electronic key 1 is indicated by a symbol KP2. In the lower part of the map, the positional information display section PD is prepared, in which a longitude and a latitude of the location as well as the location of the electronic key 1 can be displayed, being overlaid on the coast chart.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A monitoring apparatus for an electronic key, comprising:
    an immobilizer mounted on a movable body;
    a GPS navigation unit mounted on the movable body;
    monitoring means for continuously detecting communication status between an electronic key and the immobilizer, which communication deactivates a function of the immobilizer;
    means for informing the GPS navigation unit of the detected communication status by sending a signal Sw to the GPS navigation unit when the communication from the electronic key has stopped;
    means for storing and displaying a stored location of the electronic key at a time when the communication has stopped as positional information of the electronic key on a display panel of the GPS navigation unit without an action by an operator of the monitoring apparatus; and
    means for calling the stored location of the electronic key and inputting the stored location to the means for displaying the stored location on the display panel at any of a plurality of times after the time when the communication has stopped.

2. The monitoring apparatus for an electronic key according to claim 1, wherein the movable body is a saddle-ride vehicle, and
    wherein the means for calling the stored location of the electronic key and inputting the stored location to the means for displaying the stored location on the display panel after the time when the communication has stopped is an operator-activated push button.

3. The monitoring apparatus for an electronic key according to claim 1, wherein the movable body is a surface craft.

4. A displaying apparatus for positional information of an electronic key, comprising:
    an immobilizer mounted on a movable body;
    a control unit for continuously detecting communication status between the electronic key and the immobilizer;
    a GPS navigation unit mounted on the movable body and being capable of determining the positional information of the electronic key upon receipt of a signal Sw from the control unit when the communication from the electronic key has stopped;
    display control means for displaying the positional information of the electronic key at a time when the communication between the electronic key and the immobilizer is stopped, on a display panel of the GPS navigation unit as the positional information of the electronic key without an action by an operator of the displaying apparatus, and
    means for calling the stored location of the electronic key and inputting the stored location to the means for displaying the stored location on the display panel at any of a plurality of times after the time when the communication has stopped,
    wherein when the communication is stopped, the immobilizer is deactivated.

5. The displaying apparatus for positional information on an electronic key according to claim 4, wherein the positional information of the electronic key to be displayed on the display panel appears on a map displayed on the display panel using a mark and/or in texts which indicate a longitude and a latitude, in accordance with the positional information of the electronic key.

6. The displaying apparatus for positional information of an electronic key according to claim 4, wherein the immobilizer is built in the GPS navigation unit.

7. The displaying apparatus for positional information of an electronic key according to claim 4, wherein the movable body is a surface craft, and
    wherein the means for calling the stored location of the electronic key and inputting the stored location to the means for displaying the stored location on the display panel after the time when the communication has stopped is an operator-activated push button.

8. A displaying apparatus for positional information of an electronic key, comprising:
    a control unit mounted on a movable body, which includes an immobilizer allowing a driving source of the movable body to be started via communication with an electronic key;
    a navigation unit mounted on the movable body, which navigates and guides the movable body using a GPS electric wave;
    a transmitting section provided in the control unit, which transmits a request signal within a predetermined range;
    a receiving section provided in the control unit, which receives a reply signal transmitted by the electronic key in response to the request signal;
    means for storing a location of the movable body at a time when the receiving section fails to receive the reply signal in response to the request signal transmitted after the driving source is started; and
    means for sending a signal Sw to the navigation unit when the receiving section fails to receive the reply signal;
    means for displaying the stored location of the electronic key as the positional information of the electronic key on a display panel of the navigation unit without an action by an operator of the displaying apparatus, and
    means for calling the stored location of the electronic key and inputting the stored location to the means for displaying the stored location on the display panel at any of a plurality of times after the time when the communication has stopped.

9. The displaying apparatus for positional information of an electronic key according to claim 8, wherein the movable body is a surface craft, and
    wherein the positional information of the electronic key to be displayed on the display panel appears on a map displayed on the display panel using a mark and/or in texts which indicate a longitude and a latitude, in accordance with the positional information of the electronic key.

10. The displaying apparatus for positional information of an electronic key according to claim 8, wherein the movable body is a saddle-ride vehicle, and
    wherein the predetermined range of the of the request signal transmitted by the control unit is 1.5 m or less in radius about a transmitting antenna of the control unit,
    wherein at the time the receiving section fails to receive the reply signal, an actual position of the electronic key is 1.5 m or less from the stored location of the electronic key as displayed on the display panel.

11. The displaying apparatus for positional information of an electronic key according to claim 8, wherein the predetermined range of the of the request signal transmitted by the control unit is less than a range of the reply signal transmitted by the electronic key in response to the request signal.

12. The displaying apparatus for positional information of an electronic key according to claim 8,
    wherein the means for calling the stored location and inputting the stored location to the means for displaying the stored location on the display panel after the time when the communication has stopped is an operator-activated push button.

13. The displaying apparatus for positional information of an electronic key according to claim 8,
    wherein when the reply signal fails to be detected, the control unit causes the signal Sw to be sent to the navigation unit, and a warning light to be energized at the same time and without the action by the operator of the displaying apparatus.

14. The displaying apparatus for positional information of an electronic key according to claim 8, further comprising:
    means for setting positional information at a time when the reply signal fails to be detected, to the navigation unit as a navigation destination.

15. The monitoring apparatus for an electronic key according to claim 1, wherein the positional information of the electronic key is displayed on the display panel appears on a map displayed on the display panel using a mark when the electronic key is within range, and
    wherein the positional information of the electronic key is displayed on the display panel appears on the map displayed on the display panel using text which indicates a longitude and a latitude when the electronic key is not within the range.

16. The monitoring apparatus for an electronic key according to claim 1, wherein each of the monitoring means, the means for informing the GPS navigation unit, means for displaying the stored information, the means for calling the stored location, and the display unit is mounted on the movable body.

17. The displaying apparatus for positional information of an electronic key according to claim 4, wherein each of the display control means and the display panel is mounted on the movable body, and
    wherein when the communication from the electronic key has stopped, the control unit causes the signal Sw to be sent to the navigation unit and a warning light to be energized at the same time without the action by the operator of the displaying apparatus.

18. The displaying apparatus for positional information of an electronic key according to claim 4, wherein a location of the movable body is displayed on the display panel and appears on a map displayed on the display panel using text which indicates a longitude and a latitude of the movable body,
    wherein the location of the movable body and the positional information of the electronic key are displayed concurrently on the display panel.

19. The displaying apparatus for positional information of an electronic key according to claim 8, wherein the positional information of the electronic key is displayed on the display panel appears on a map displayed on the display panel using a mark when the electronic key is within the predetermined range, and
    wherein the positional information of the electronic key is displayed on the display panel appears on the map displayed on the display panel using text which indicates a longitude and a latitude when the electronic key is not within the predetermined range.

20. The displaying apparatus for positional information of an electronic key according to claim 8, wherein a location of the movable body is displayed on the display panel and appears on a map displayed on the display panel using text which indicates a longitude and a latitude of the movable body,
    wherein the location of the movable body and the positional information of the electronic key are displayed concurrently on the display panel.

* * * * *